US010209583B2

(12) United States Patent
Guo et al.

(10) Patent No.: US 10,209,583 B2
(45) Date of Patent: Feb. 19, 2019

(54) DISPLAY PANEL AND DISPLAY APPARATUS

(71) Applicants: BOE TECHNOLOGY GROUP CO., LTD, Beijing (CN); HEFEI BOE OPTOELECTRONICS TECHNOLOGY CO., LTD., Hefei (CN)

(72) Inventors: Yuanhui Guo, Beijing (CN); Yuansheng Zang, Beijing (CN); Zhi Liu, Beijing (CN)

(73) Assignees: BOE TECHNOLOGY GROUP CO., LTD, Beijing (CN); HEFEI BOE OPTOELECTRONICS TECHNOLOGY CO., LTD., Hefei (CN)

( * ) Notice: Subject to any disclaimer, the term of this patent is extended or adjusted under 35 U.S.C. 154(b) by 80 days.

(21) Appl. No.: 15/500,944

(22) PCT Filed: Jun. 7, 2016

(86) PCT No.: PCT/CN2016/085095

§ 371 (c)(1),
(2) Date: Feb. 1, 2017

(87) PCT Pub. No.: WO2017/032130

PCT Pub. Date: Mar. 2, 2017

(65) Prior Publication Data

US 2017/0219867 A1 Aug. 3, 2017

(30) Foreign Application Priority Data

Aug. 21, 2015 (CN) .......................... 2015 1 0519838

(51) Int. Cl.
*G02F 1/1343* (2006.01)
*G02F 1/1339* (2006.01)
(Continued)

(52) U.S. Cl.
CPC ...... *G02F 1/13439* (2013.01); *G02F 1/13394* (2013.01); *G02F 1/133512* (2013.01);
(Continued)

(58) Field of Classification Search
CPC .................................................. G02F 1/13439
See application file for complete search history.

(56) References Cited

U.S. PATENT DOCUMENTS

2009/0316061 A1 12/2009 Kao
2012/0293756 A1* 11/2012 Matsumoto ....... G02F 1/134363 349/106
(Continued)

FOREIGN PATENT DOCUMENTS

CN 101506725 A 8/2009
CN 103885260 A * 6/2014
(Continued)

OTHER PUBLICATIONS

The World Intellectual Property Organization (WIPO) International Search Report for PCT/CN2016/085095 dated Sep. 1, 2016 p. 1-14.

*Primary Examiner* — Edmond C Lau
(74) *Attorney, Agent, or Firm* — Anova Law Group, PLLC

(57) ABSTRACT

In accordance with various embodiments of the disclosed subject matter, a display panel, and a related display apparatus are provided. In some embodiments, the display panel comprises: a plurality of first sub-pixels adjacent to a photo spacer; and a plurality of second sub-pixels separated from the major photo spacer; wherein an aperture area of each first sub-pixel is smaller than an aperture area of each second sub-pixel, while a light transmittance of each first sub-pixel is substantially equal to a light transmittance of each second sub-pixel.

19 Claims, 1 Drawing Sheet

(51) Int. Cl.
*G02F 1/1362* (2006.01)
*G02F 1/1335* (2006.01)

(52) U.S. Cl.
CPC .. *G02F 1/134309* (2013.01); *G02F 1/136286* (2013.01); *G02F 2001/134345* (2013.01); *G02F 2201/121* (2013.01); *G02F 2201/123* (2013.01)

(56) References Cited

U.S. PATENT DOCUMENTS

| | | | | |
|---|---|---|---|---|
| 2014/0085582 | A1* | 3/2014 | Chang | G02F 1/133707 349/138 |
| 2014/0340622 | A1* | 11/2014 | Ono | G02F 1/134363 349/138 |

FOREIGN PATENT DOCUMENTS

| | | | |
|---|---|---|---|
| CN | 104020605 | A | 9/2014 |
| CN | 104199211 | A | 12/2014 |
| CN | 104267530 | A | 1/2015 |
| CN | 105158993 | A | 12/2015 |

* cited by examiner

DISPLAY PANEL AND DISPLAY APPARATUS

CROSS-REFERENCES TO RELATED APPLICATIONS

This application is a national phase entry under 35 U.S.C. § 371 of International Application No. PCT/CN2016/085095, filed on Jun. 7, 2016, which claims priority to Chinese Patent Application No. 201510519838.6 filed on Aug. 21, 2015. The above enumerated patent applications are incorporated by reference herein in their entirety.

TECHNICAL FIELD

The disclosed subject matter generally relates to display technologies and, more particularly, relates to is display panel, and a related display apparatus.

BACKGROUND

A liquid crystal display (LCD) panel includes an array substrate and a color filter substrate. Photo spacers can be formed between the at substrate and the color filter substrate to control the thickness of the LCD panel. In order not to affect the display function, photo spacers are usually placed under the black matrixes.

With the increased of the resolution of LCD panels, each pixel becomes smaller and smaller. In order to ensure that each sub-pixel has a sufficient aperture ratio, the area of each black matrix has decreased along with the gradually increase of the resolution. However, in order to ensure sufficient support for the liquid crystal cell, the size of the photo spacers cannot always be reduced with the increased resolution.

Since each of the photo spacer is usually located under the black matrix, when the area of the black matrix is reduced, the distance between the photo spacer and the edge of the black matrix is reduced, which means a distance between the photo spacer and the pixel aperture area is reduced. Therefore, when under a pressure, the photo spacer may easily hit the pixel aperture area, and may scratch the aliment film, which may result in a leakage of light, thereby affecting the displaying quality.

In some existing products, large-sized photo spacers are bevelled to increase the distances from photo spacers to the pixel aperture area. However, due to the sub-pixels that surrounds the photo spacers have increased bevels, some negative phenomena such as tilt fringes may appear during the image displaying.

BRIEF SUMMARY

In accordance with various embodiments of the disclosed subject matter, a display panel, and a related display apparatus are provided to at least partially alleviate one or more problems set forth above and to solve other problems in the art.

An aspect of the present disclosure provides a display panel, comprising: a plurality of first sub-pixels adjacent to a photo spacer; and a plurality of second sub-pixels separated from the major photo spacer; wherein an aperture area of each first sub-pixel is smaller than an aperture area of each second sub-pixel, while a light transmittance of each first sub-pixel is substantially equal to a light transmittance of each second sub-pixel.

In some embodiments, the display panel further comprises: a plurality of plate-shaped electrodes being respectively located in the plurality of first sub-pixels and the plurality of second sub-pixels; and, a plurality of slit-shaped electrodes respectively located in an area of one plate electrode; wherein the plurality of slit electrodes are insulated from the plurality of plate-shaped electrodes.

In some embodiments, a width of one slit-shaped electrode corresponding to a first sub-pixel is less than a width of one slit-shaped electrode corresponding to a second sub-pixel.

In some embodiments, a distance between two adjacent slit-shaped electrodes corresponding to the first sub-pixel is larger than a distance between two adjacent slit-shaped electrodes corresponding to the second sub-pixel.

In some embodiments, a width of an electrode line adjacent to one slit-shaped electrode corresponding to a first sub-pixel is less than a width of an electrode line adjacent to one slit-shaped electrode corresponding to a second sub-pixel.

In some embodiments, a distance between the electrode line and the one slit-shaped electrode corresponding to the first sub-pixel is larger than a distance between the electrode line and the one slit-shaped electrode corresponding to the second sub-pixel.

In some embodiments, a distance between one plate-shaped electrode and an adjacent electrode line corresponding to the first sub-pixels is less than a distance between one plate-shaped electrode and an adjacent electrode line corresponding to the second sub-pixels.

In some embodiments, a width of the plate-shaped electrode corresponding to the first sub-pixels is larger than a width of the plate-shaped electrode corresponding to the second sub-pixels.

In some embodiments, a width of the adjacent electrode line corresponding to the first sub-pixels is larger than a width of the adjacent electrode line corresponding to the second sub-pixels.

In some embodiments, an overlapping area of an electrode line adjacent to one plate-shaped electrode and an electrode line adjacent to one slit-shaped electrode corresponding to the first sub-pixels is less than an overlapping area of an electrode line adjacent to one plate-shaped electrode and an electrode line adjacent to one slit-shaped electrode corresponding to the second sub-pixel.

In some embodiments, the plate-shaped electrodes are common electrodes; the electrode lines adjacent to the plate-shaped electrodes are common electrode lines; the slit-shaped electrodes are pixels electrodes; and the electrode lines adjacent to the slit-shaped electrodes are data lines.

In some embodiments, the slit-shaped electrodes are common electrodes; the electrode lines adjacent to the slit-shaped electrodes are common electrode lines; the plate-shaped electrodes are pixels electrodes; and the electrode lines adjacent to the plate-shaped electrodes are data lines.

In some embodiments, the data lines and the pixel electrodes are formed in one fabricating step.

In some embodiments, the common electrode lines and the common electrodes are formed in one fabrication step.

In some embodiments, one common electrode line is equally distanced from two adjacent common electrodes; and one data line is equally distanced from the two adjacent pixel electrodes.

In some embodiments, the data lines have a same width.

In some embodiments, a difference between the width of one slit-shaped electrode corresponding to one first sub-pixel and the width of one slit-shaped electrode corresponding to one second sub-pixel is between 0.1 μm and 1 μm.

In some embodiments, a difference of the width of the electrode line adjacent to one slit-shaped electrode corresponding to one first sub-pixel and the width of the electrode line adjacent to one slit-shaped electrode corresponding to one second sub-pixel is between 0.1 μm and 1 μm.

Another aspect of the present disclosure provides a display apparatus, comprising the disclosed display panel.

Other aspects of the present disclosure can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

In accordance with various embodiments, the disclosed subject matter provides a display panel, and a related display apparatus.

In LCD display panels, a photo spacer is usually located under the black matrix. When the area of the black matrix is reduced, the distance between the photo spacer and the edge of the black matrix is reduced, which means the distance between the photo spacer and the transparent display region is reduced. Therefore, when under pressure, the photo spacer may easily contact the transparent display region, and may scratch the aliment film. This may result in light scattering, thereby affecting the displaying quality.

Often, large-sized photo spacers are beveled to increase the distances from the photo spacers to the transparent display regions. However, because the sub-pixels that surrounds the photo spacers have increased bevels, some negative effects, such as stripes or other light scattering patterns, may appear in the image displays.

Figure 1:
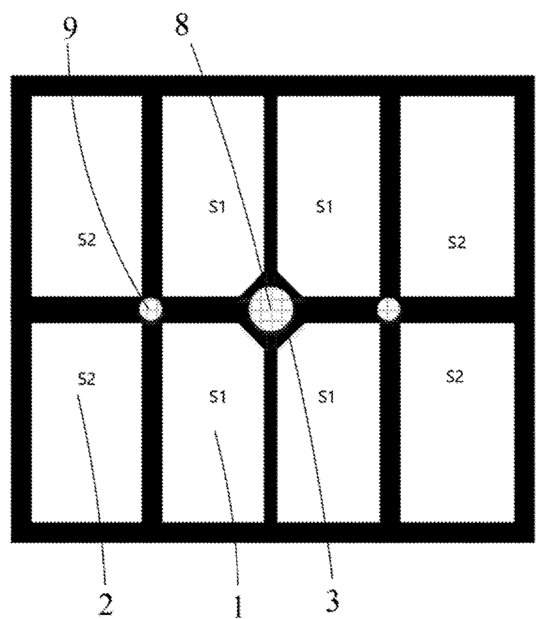
FIG. 1 is a schematic structural top view diagram of an exemplary display panel in accordance with some embodiments of the disclosed subject matter.

Referring to FIG. 1, a schematic structural top view diagram of an exemplary display panel is shown in accordance with some embodiments of the disclosed subject matter. In some embodiments, the display panel may include multiple sub-pixels, such as sub-pixel 1 and sub-pixel 2 illustrated in FIG. 1, arranged in a matrix array. The display panel may further include one or more photo spacers 8 located among some of the multiple sub-pixels.

It should be noted that, the one or more photo spacers 8 are under the black matrixes 3. In a top view of the display panel, the one or more photo spacers 8 are covered by the black matrixes 3. In FIG. 1, the one or more photo spacers 8 are illustrated merely for indicating the locations of the one or more photo spacers 8.

It also be noted that, the one or more photo spacers 8 are major photo spacers having a large size. Therefore, the portions of the black matrixes 3 above the one or more photo spacers 8 are beveled to increase the area of the portions of the black matrixes 3 for fully covering the one or more photo spacers 8.

Sub-pixels 1 refer to the sub-pixels being adjacent a photo spacer 8. Sub-pixels 2 refer to the sub-pixels separated from the photo spacers 8.

It should be noted that, sub-pixels 2 may still being adjacent to one or more minor photo spacers 9 having a small size that can be fully covered by the normal sized black matrixes.

Sub-pixels 1 may have different aperture areas from those of sub-pixels 2 because sub-pixels 1 are often beveled to accommodate the placements of the photo spacers 8. The aperture area used herein are defined by the area of a sub-pixel that is enclosed by the surrounding black matrixes. Since a photo spacer 8 occupy more area than a photo spacer 9, each sub-pixel 1 is beveled so having a smaller aperture area compared to sub-pixel 2.

In some embodiments, by adjusting various parameters of the pixel circuits, such as the widths of the common electrodes and the widths of the pixel electrodes, etc., of the sub-pixels 1 and sub-pixels 2, the sub-pixels 1 and the sub-pixels 2 can achieve identical light transmittance rates. Thus, in embodiments of the present disclosure, the display panel does not display stripes or light scattering patterns caused by the photo spacers in image displays.

Figure 2:
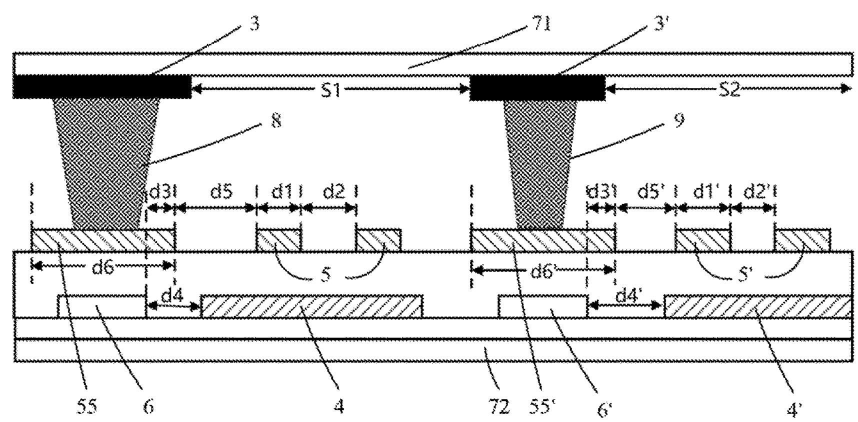
FIG. 2 is a schematic structural cross-sectional view diagram of an exemplary display panel in accordance with some embodiments of the disclosed subject matter.

Specifically, referring to FIG. 2, a schematic structural cross-sectional view of an exemplary display panel is shown in accordance with some embodiments of the disclosed subject matter. The display panel can include first substrate 71 and second substrate 72. The multiple sub-pixels are located on the second substrate 72. Pixel electrodes 4 and 4' are formed respectively in the multiple sub-pixels.

It should be noted that, in the exemplary display panel illustrated in FIG. 2 and discussed in the following description, the pixel electrodes 4 and 4' are plate-shaped electrodes, and the common electrodes 5 and 5' are slit-shaped electrodes. In some other embodiments, the pixel electrodes can be slit-shaped electrodes while the common electrodes can be plate-shaped electrodes.

Referring back to FIG. 1, the sub-pixels that are adjacent to the photo spacer 8 are labelled as first sub-pixels 1, and the sub-pixels that are not neighboring to the photo spacer 8 are labelled as second sub-pixels 2.

Often, in the existing display panel, the sizes of all pixel electrode are almost equal. However, compared to the second sub-pixels 2, the first sub-pixels 1 are closer to the photo spacer 8, and are blocked by the black matrixes above the photo spacers 8. So the area of the light transmitted through a first sub-pixel 1 is smaller than the area of the light transmitted through a second sub-pixel 2.

Returning to FIG. 2, a width of the black matrix 3 above the large-sized photo spacer 8 is larger than a width of the black matrix 3' above the small-sized photo spacer 9. The first sub-pixels 1 adjacent to the photo spacer 8 can include slit-shaped electrodes 5 and adjacent electrode line 55, plate electrode 4 and adjacent electrode line 6. The second sub-pixels 2 separated from the photo spacer 8 can include slit-shaped electrodes 5' and adjacent electrode line 55', plate electrode 4' and adjacent electrode line 6.

As mentioned before, the slit-shaped electrodes can be common electrodes while plate-shaped electrodes are pixel electrodes, as illustrated in FIG. 2. In some other embodiments, plate-shaped electrodes can be common electrode while slit-shaped electrodes can be pixel electrodes.

In some embodiments of the disclosed subject matter, by increasing the area of the plate electrodes 4 in first sub-pixels 1, such that the area of the light transmitted through a first sub-pixel 1 can be substantially equal to the area of the light transmitted through a second sub-pixel 2. That is, the difference between the aperture ratios of the first sub-pixel 1 and the second sub-pixel 2 is reduced. Therefore, some negative effect such as stripes or light scattering can be effectively reduced or eliminated.

In some embodiments, under a premise that the data line 6 is not changed, by reducing the distance d4 between the pixel electrode 4 and the data line 6, the area of pixel electrodes 4 in first sub-pixels 1 can be increased. For example, pixel electrodes 4 can be extended toward the direction of the data line 6 to increase the area of the pixel electrodes 4.

That is, the distance d4 between the plate-shaped electrode 4 and the adjacent electrode line 6 of the first sub-pixels 1 is less than the distance d4' between the plate electrode 4' and the adjacent electrode line 6' of the second sub-pixels 2.

In some embodiments, the disclosed display panel further includes multiple common electrodes 5 that are located over the multiple pixel electrodes 4 in corresponding sub-pixels. The common electrodes 5 are insulated from the pixel electrodes 4. The common electrodes 5 that are corresponding to the pixel electrodes 4 are slit-shaped electrodes.

In some embodiments, a slit-shaped electrode corresponding to a first sub-pixel 1 has a smaller width comparing to another slit-shaped electrode corresponding to a second sub-pixel 2. Moreover, a space between two adjacent slit-shaped electrodes corresponding to the first sub-pixels 1 is larger than a space between two adjacent slit-shaped electrodes corresponding to the second sub-pixel 2.

Therefore, as illustrated in FIG. 2, the width d1 of slit-shaped electrodes that correspond to the first sub-pixels 1 can be reduced to decrease a dark area of the indium tin oxides (ITO) electrodes. So that the electric field at the edges of each slit-shaped electrode can be increased, thereby the light deflection direction of the liquid crystal can be controlled to change the light transmittance of the first sub-pixel 1, which may make the transmittance of the first sub-pixel 1 equal to the light transmittance of the second sub-pixel 2.

In some embodiments, a summation of the width d1 of the slit-shaped electrode and the distance d2 between adjacent slit-shaped electrodes is a constant. Therefore, when the width d1 of the slit-shaped electrode in a first sub-pixel 1 is decreased, the distance d2 between adjacent slit-shaped electrodes is increased.

In some embodiments, a width d1 of the common electrode 5 of the first sub-pixel 1 is less than the width d1' of the common electrode 5' of the second sub-pixel 2.

In other words, the width d1 of the common electrode 5 of the first sub-pixels 1 can be reduced to decrease the dark area of the indium tin oxides (ITO) electrode. That is, the width d1 of the common electrode 5 of the first sub-pixels 1 is less than the width d1' of the common electrode 5' of the second sub-pixels 2. So that the distance d2 between slit-shaped electrodes of the first sub-pixels 1 is larger than the distance d2' between slit-shaped electrodes of the second sub-pixels 2.

In some embodiments, the width d6 of the common electrode line 55 of the first sub-pixels 1 can be further reduced to increase the distance d5 between one common electrode 5 and the adjacent common electrode line 55.

Therefore, the electric field at the edges of each slit-shaped electrode can be increased thereby, the deflection direction of the liquid crystal can be controlled to change the light transmittance of the first sub-pixel 1, to make the transmittance of the first sub-pixel 1 equal to the light transmittance of the second sub-pixel 2.

In some embodiments, the distance d3 from the edge of data line 6 to the edge of common electrode line 55 can be reduced in the first sub-pixel 1. It can be realized by decreasing the area of the pixel electrode 4 and increasing the area of the data line 6. In such embodiments, the distances d1, d2, and d4 can be unchanged, and the distance d3 is reduced.

That is, a distance from the edge of the electrode line adjacent to the plate-shaped electrode to the edge of the electrode line adjacent to the slit-shaped electrode in the first sub-pixel 1 is less than the corresponding distance in the second sub-pixel 2. Therefore, the first sub-pixel 1 and the second sub-pixel 2 can have substantially equal light transmittance.

In some embodiments, the disclosed display panel further comprises multiple black matrixes 3 corresponding to multiple photo spacers 8 and multiple data lines 6 corresponding to the multiple black matrixes 3 respectively.

In some existing LCD panels, a photo spacer is usually disposed between a black matrix 3 and a corresponding common electrode 5 for controlling the thickness of the LCD panel. In some embodiments of the disclosed display panel, the multiple data lines 6 and the multiple pixel electrodes 4 are formed in a single fabrication process, and are formed in a same level, as illustrated in FIG. 2. In this case, the fabricating process is simplified. An increasing of the area of pixel electrode 4 in the first sub-pixel 1 is equivalent to a decreasing of the distance d4 between the pixel electrode 4 and the data line 6.

In some embodiments, the common electrode 5 corresponding to the black matrix 3 is equally distanced from the two adjacent slit-shaped electrodes corresponding to the first sub-pixels 1.

In some embodiments, each data line has a same width.

In some embodiments, the difference between the width of the slit-shaped electrode corresponding to the first sub-pixel 1 and the width of the slit-shaped electrode corresponding to the second sub-pixel 2 is between 0.1 μm and 1 μm. Optionally, the difference between the width of the slit-shaped electrode corresponding to the first sub-pixel 1 and the width of the slit-shaped electrode corresponding to the second sub-pixel 2 is 0.2 μm.

In some embodiments, the difference between the width of the common electrode that is surrounded by the four first sub-pixels 1 and the width of the common electrode that is surrounded by the four second sub-pixels 2 is between 0.1 μm and 1 μm.

Optionally, the difference between the width of the common electrode that is surrounded by the four first sub-pixels 1 and the width of the common electrode that is surrounded by the four second sub-pixels 2 is 0.4 μm.

Examples of two 5-inch display panels having 1280*720 resolution are described in the following paragraphs.

In a first example, a first display panel does not use the disclosed subject matter. The first display panel has 5-inch size with a resolution of 1280*720.

In a second sub-pixel 2, d1=3.0 μm, d2=4.7 μm, d3=2.6 μm, d4=5.0 μm, the aperture ratio of the second sub-pixel 2 is 60%.

In a first sub-pixel 1, d1=3.0 μm, d2=4.7 μm, d3=2.6 μm, d4=5.0 μm. Since a bevel of the first sub-pixel that is close to the photo spacer 8 is blocked by black matrix 3, the aperture ratio of the first sub-pixel 1 is 55%, which is less than the aperture ratio of the second sub-pixel 2 of 60%.

Since the light transmittance rate of the first sub-pixel is different from the light transmittance of the second sub-pixel, the first display panel may show stripes and light scattering effect on the display.

In a second example, a second display panel uses the disclosed subject matter. The second display panel also has 5-inch size with a resolution of 1280*720.

In a second sub-pixel 2, d1=3.0 μm, d2=4.7 μm, d3=2.6 μm, d4=5.0 μm, the aperture ratio of the second sub-pixel 2 is 60%.

In a first sub-pixel 1, d1=2.8 μm, d2=4.9 μm, d3=2.4 μm, d4=4.7 μm. Since a bevel of the first sub-pixel that is close to the photo spacer 8 is blocked by black matrix 3, the aperture ratio of the first sub-pixel 1 is 55%, which is less than the aperture ratio of the second sub-pixel 2 of 60%. However, in this example, it can be determined by a software simulation, the first sub-pixel 1 and the second sub-pixel 2 can have identical light transmittance rate in L255 state. Thus, the second display panel does not display stripes or show light scattering caused by the photo spacers at all.

In a third example, a first display panel does not use the disclosed subject matter. The first display panel has 5-inche size, and each sub-pixel has a size of 28.75 μm*86.25 μm. In the first display panel, d1=3.5 μm, d2=4.2 μm, d3=3.2 μm, d4=5.5 μm, and d5=4.2 μm for all first sub-pixels and second sub-pixels. The second sub-pixels have an aperture ratio of 50%, and have a light transmittance of 4.52%. While the first sub-pixels have an aperture ratio of 45%, and have a light transmittance of 4.3%. Clearly, the light transmittance of the first sub-pixels is reduced about 10% comparing to the light transmittance of the second sub-pixels.

In a second display panel, by decreasing the d1 of the first sub-pixels to 2.9 μm, increasing the d2 of the first sub-pixels to 4.8 μm, and keeping other parameters fixed, a light transmittance of the first sub-pixels can be increased up to 4.53%.

In a third display panel, by decreasing the d4 of the first sub-pixels to 4.5 μm, and keeping other parameters fixed, a light transmittance of the first sub-pixels can be increased up to 4.49%.

In a fourth display panel, by decreasing, the d3 of the first sub-pixels to 2.5 μm, increasing the d5 of the first sub-pixels to 4.8 μm, and keeping other parameters fixed, a light transmittance of the first sub-pixels can be increased up to 4.30%.

It should be noted that, various changes can be made in the above-described specific embodiments. For example: the width of the common electrode may be changed in accordance with the change of the display panel size to make sure although a first sub-pixel 1 has a smaller aperture ratio but it has a light transmittance rate equaling to that of a second sub-pixel 2.

Another aspect of the disclosed subject, matter provides a display apparatus including any one of the disclosed display panel described above. The display apparatus can be any suitable device or component that has a display function, such as a LCD panel, an electronic paper, a mobile phone, a tablet computer, a television, a monitor, a notebook computer, a digital picture frame, a navigation system, a smart watch, etc.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a display apparatus and a related display method are provided.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A display panel, comprising:

a plurality of first sub-pixels adjacent to a major photo spacer;

a plurality of second sub-pixels separated from the major photo spacer;

a plurality of plate-shaped electrodes being respectively located in the plurality of first sub-pixels and the plurality of second sub-pixels; and a plurality of slit-shaped electrodes respectively located in an area of one plate electrode, wherein:

an aperture area of each first sub-pixel is smaller than an aperture area of each second sub-pixel, while a light transmittance of each first sub-pixel is substantially equal to a light transmittance of each second sub-pixel, and a distance between two adjacent slit-shaped electrodes corresponding to the first sub-pixel is greater than a distance between two adjacent slit-shaped electrodes corresponding to the second sub-pixel.

2. The display panel of claim 1, wherein the plurality of slit-shaped electrodes are insulated from the plurality of plate-shaped electrodes.

3. The display panel of claim 2, wherein a width of one slit-shaped electrode corresponding to a first sub-pixel is less than a width of one slit-shaped electrode corresponding to a second sub-pixel.

4. The display panel of claim 2, wherein a width of an electrode line adjacent to one slit-shaped electrode corresponding to a first sub-pixel is less than a width of an electrode line adjacent to one slit-shaped electrode corresponding to a second sub-pixel.

5. The display panel of claim 4, wherein a distance between the electrode line and the one slit-shaped electrode corresponding to the first sub-pixel is larger than a distance between the electrode line and the one slit-shaped electrode corresponding to the second sub-pixel.

6. The display panel of claim 2, wherein a distance between one plate-shaped electrode and an adjacent electrode line corresponding to the first sub-pixels is less than a distance between one plate-shaped electrode and an adjacent electrode line corresponding to the second sub-pixels.

7. The display panel of claim 6, wherein a width of the plate-shaped electrode corresponding to the first sub-pixels is larger than a width of the plate-shaped electrode corresponding to the second sub-pixels.

8. The display panel of claim 6, wherein a width of the adjacent electrode line corresponding to the first sub-pixels is larger than a width of the adjacent electrode line corresponding to the second sub-pixels.

9. The display panel of claim 2, wherein an overlapping area of an electrode line adjacent to one plate-shaped electrode and an electrode line adjacent to one slit-shaped electrode corresponding to the first sub-pixels is less than an overlapping area of an electrode line adjacent to one plate-shaped electrode and an electrode line adjacent to one slit-shaped electrode corresponding to the second sub-pixel.

10. The display panel of claim 2, wherein:

the plate-shaped electrodes are common electrodes;

the electrode lines adjacent to the plate-shaped electrodes are common electrode lines;

the slit-shaped electrodes are pixels electrodes; and the electrode lines adjacent to the slit-shaped electrodes are data lines.

11. The display panel of claim 2, wherein:

the slit-shaped electrodes are common electrodes;

the electrode lines adjacent to the slit-shaped electrodes are common electrode lines;

the plate-shaped electrodes are pixels electrodes; and the electrode lines adjacent to the plate-shaped electrodes are data lines.

12. The display panel of claim 11, wherein the data lines and the pixel electrodes are formed in one fabricating step.

13. The display panel of claim 11, wherein the common electrode lines and the common electrodes are formed in one fabrication step.

14. The display panel of claim 11, wherein:

one common electrode line is equally distanced from two adjacent common electrodes; and one data line is equally distanced from the two adjacent pixel electrodes.

15. The display panel of claim 11, wherein the data lines have a same width.

16. The display panel of claim 3, wherein a difference between the width of one slit-shaped electrode corresponding to one first sub-pixel and the width of one slit-shaped electrode corresponding to one second sub-pixel is between 0.1 μm and 1 μm.

17. The display panel of claim 6, wherein a difference of the width of the electrode line adjacent to one slit-shaped electrode corresponding to one first sub-pixel and the width of the electrode line adjacent to one slit-shaped electrode corresponding to one second sub-pixel is between 0.1 μm and 1 μm.

18. A display apparatus, comprising the display panel of claim 1.

19. A display panel, comprising:

a plurality of first sub-pixels adjacent to a major photo spacer;

a plurality of second sub-pixels separated from the major photo spacer;

a plurality of plate-shaped electrodes being respectively located in the plurality of first sub-pixels and the plurality of second sub-pixels; and a plurality of slit-shaped electrodes respectively located in an area of one plate electrode, wherein:

an aperture area of each first sub-pixel is smaller than an aperture area of each second sub-pixel, while a light transmittance of each first sub-pixel is substantially equal to a light transmittance of each second sub-pixel, and a width of an electrode line adjacent to one slit-shaped electrode corresponding to a first sub-pixel is less than a width of an electrode line adjacent to one slit-shaped electrode corresponding to a second sub-pixel.

* * * * *